US012596916B2

(12) United States Patent
Das et al.

(10) Patent No.: US 12,596,916 B2
(45) Date of Patent: Apr. 7, 2026

(54) CONSTRAINED MASKING FOR SPARSIFICATION IN MACHINE LEARNING

(71) Applicant: QUALCOMM Incorporated, San Diego, CA (US)

(72) Inventors: Debasmit Das, San Diego, CA (US); Jamie Menjay Lin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 837 days.

(21) Appl. No.: 17/932,941

(22) Filed: Sep. 16, 2022

(65) Prior Publication Data

US 2024/0095504 A1      Mar. 21, 2024

(51) Int. Cl.
| | |
|---|---|
| *G06N 3/048* | (2023.01) |
| *G06N 3/045* | (2023.01) |
| *G06N 3/0495* | (2023.01) |
| *G06N 3/063* | (2023.01) |
| *G06N 3/08* | (2023.01) |
| *G06N 3/09* | (2023.01) |
| *G06N 5/04* | (2023.01) |

(52) U.S. Cl.
CPC ............. *G06N 3/048* (2023.01); *G06N 3/063* (2013.01); *G06N 3/08* (2013.01); *G06N 5/04* (2013.01)

(58) Field of Classification Search
CPC .......... G06N 3/048; G06N 3/063; G06N 3/08; G06N 5/04; G06N 3/045; G06N 3/0495; G06N 3/09; G06N 3/0895; G06N 3/091; G06N 3/092; G06N 3/094; G06N 3/096; G06N 3/098; G06N 3/0985; G06N 3/0455; G06N 3/04
See application file for complete search history.

(56) References Cited

U.S. PATENT DOCUMENTS

| | | | |
|---|---|---|---|
| 2022/0207372 A1* | 6/2022 | Pandey | G06F 18/211 |
| 2024/0104352 A1* | 3/2024 | Zhang | G06N 3/0895 |

OTHER PUBLICATIONS

Luo et al., AutoPruner: An End-to-End Trainable Filter Pruning Method for Efficient Deep Model Inference, Jan. 17, 2019, https://arxiv.org/pdf/1805.08941 (Year: 2019).*
Feng et al., "An Automatically Layer-Wise Searching Strategy for Channel Pruning Based on Task-Driven Sparsity Optimization," Sep. 6, 2022, in IEEE Transactions on Circuits and Systems for Video Technology, vol. 32, No. 9, pp. 5790-5802, https://doi.org/10.1109/TCSVT.2022.3156588 (Year: 2022).*

(Continued)

*Primary Examiner* — Kakali Chaki
*Assistant Examiner* — Molly C Sippel
(74) *Attorney, Agent, or Firm* — Patterson & Sheridan LLP

(57) ABSTRACT

Certain aspects of the present disclosure provide techniques and apparatus for feature masking. A feature tensor is accessed in a neural network, and a feature mask is generated by processing the feature tensor using a masking subnetwork, where the masking subnetwork was trained based at least in part on a polarization constraint and an activation constraint to generate feature masks. A masked feature tensor is generated based on the feature tensor and the feature mask, and an output inference is generated using the neural network based at least in part on the masked feature tensor.

24 Claims, 6 Drawing Sheets

(56) References Cited

OTHER PUBLICATIONS

Jang E., et al., "Categorical Reparameterization with Gumbel-Softmax", ICLR 2017 Conference, Cornell University Library, 201 Olin Library Cornell University, Ithaca, NY 14853, Aug. 5, 2017, XP080729237, pp. 1-13, arXiv: 1611.01144v5, abstract; figures 1-5, p. 1, line 1-p. 8, last line.

Jeong J., et al., "Imposing Consistency for Optical Flow Estimation", pp. 3181-3191, Apr. 2022.

Maddison C.J., et al., "The Concrete Distribution: A Continuous Relaxation of Discrete Random Variables", ICLR 2017 Conference, Cornell University Library, 201 Olin Library Cornell University Ithaca, NY 14853, arXiv:1611.00712v3 [cs.LG], Mar. 5, 2017, XP080729141, pp. 1-20, Pages, abstract; figures 1-4 p. 1, line 1-p. 9, last line.

Zhao S., et al., "MaskFlownet: Asymmetric Feature Matching with Learnable Occlusion Mask", CVPR Aug. 2020, pp.6278-6287.

International Search Report and Written Opinion—PCT/US2023/070847—ISA/EPO—Nov. 3, 2023.

Zhang X., et al., "Feature Map Masking Based Single-Stage Face Detection", 2020 IEEE International Joint Conference on Biometrics (IJCB), IEEE, Sep. 28, 2020, 7 Pages, XP033871297, Abstract, Figures 1, 2, p. 2, col. 1, Line 8-col. 2, Line 8, p. 3, col. 2, Line 23—p. 4, col. 2, Line 23.

\* cited by examiner

400

Receive mask — 405

Generate polarization loss based on mask — 410

Generate activation loss based on mask — 415

Receive masked feature tensor — 420

Generate task loss based on masked feature tensor — 425

Aggregate polarization loss, activation loss, and task loss — 430

Refine mask generator and feature extractor — 435

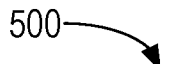

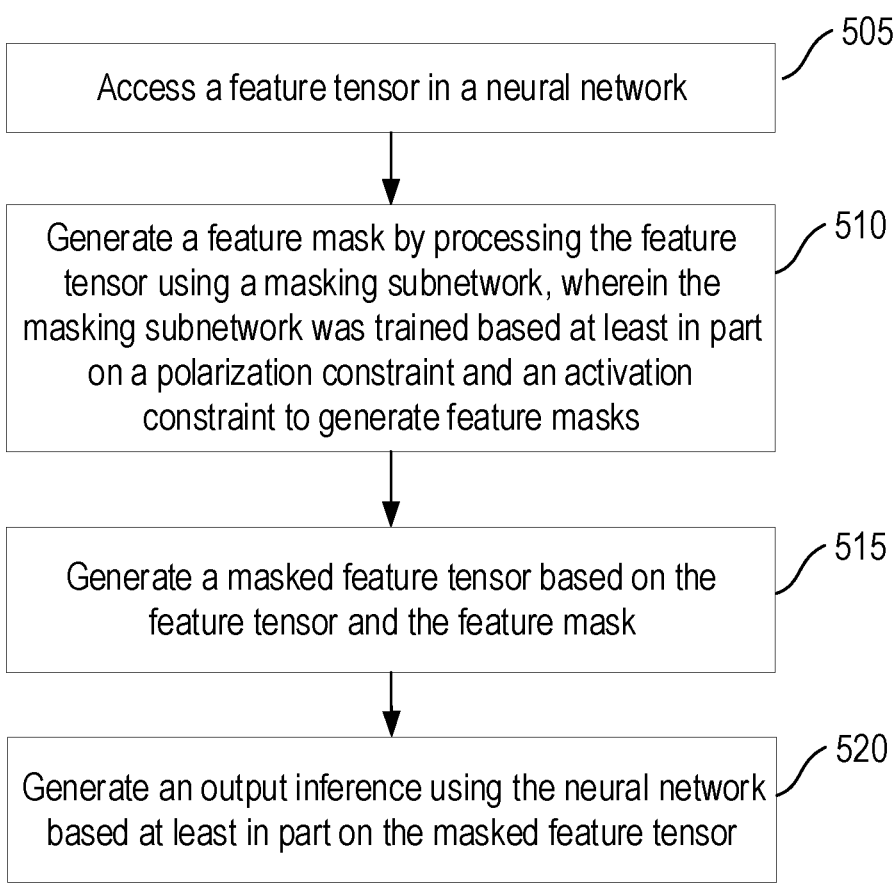

505

Access a feature tensor in a neural network

510

Generate a feature mask by processing the feature tensor using a masking subnetwork, wherein the masking subnetwork was trained based at least in part on a polarization constraint and an activation constraint to generate feature masks

515

Generate a masked feature tensor based on the feature tensor and the feature mask

520

Generate an output inference using the neural network based at least in part on the masked feature tensor

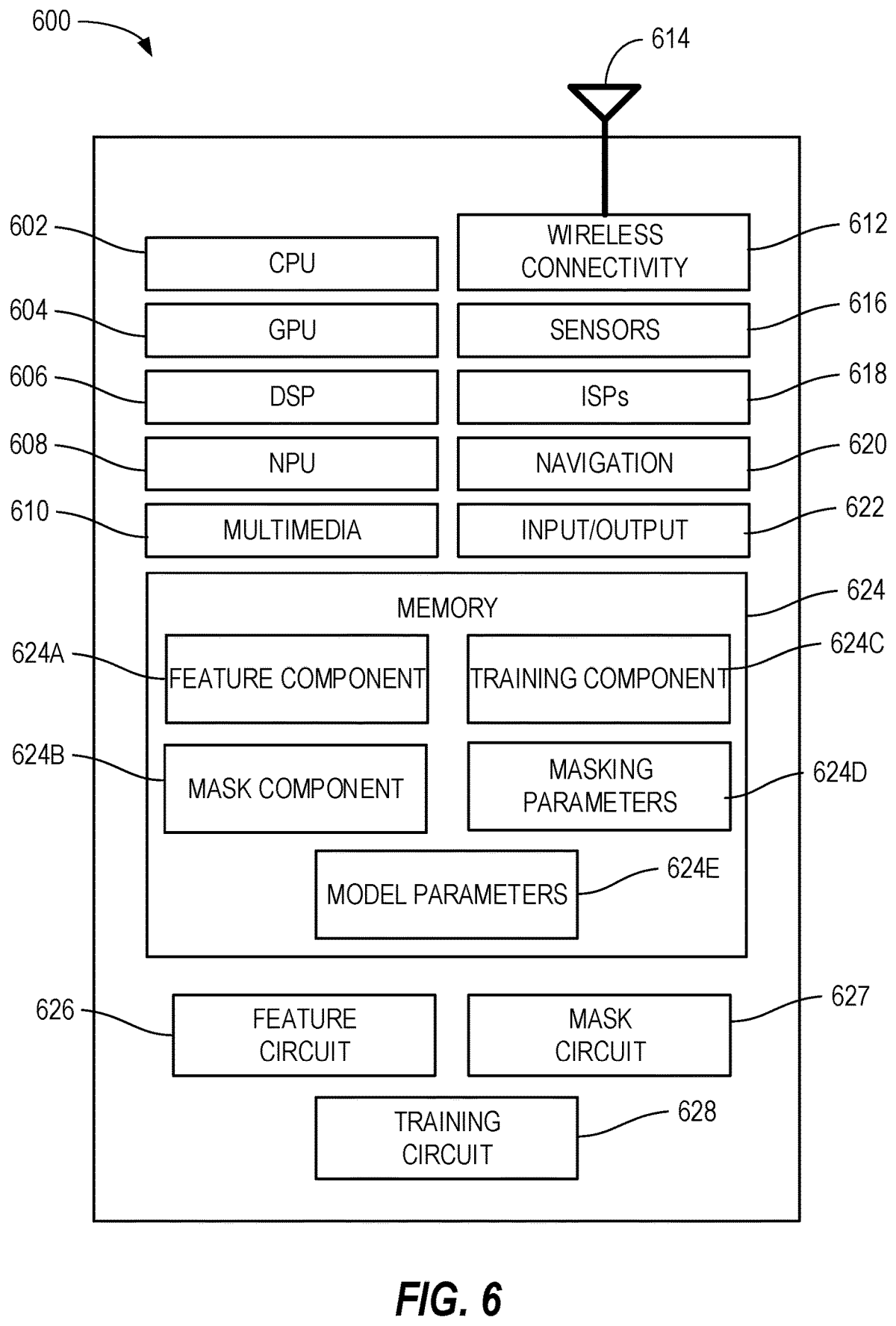

| | |
|---|---|
| 602 CPU | 612 WIRELESS CONNECTIVITY |
| 604 GPU | 616 SENSORS |
| 606 DSP | 618 ISPs |
| 608 NPU | 620 NAVIGATION |
| 610 MULTIMEDIA | 622 INPUT/OUTPUT |

624 MEMORY

| | |
|---|---|
| 624A FEATURE COMPONENT | 624C TRAINING COMPONENT |
| 624B MASK COMPONENT | 624D MASKING PARAMETERS |

624E MODEL PARAMETERS

| | |
|---|---|
| 626 FEATURE CIRCUIT | 627 MASK CIRCUIT |

628 TRAINING CIRCUIT

*FIG. 6*

CONSTRAINED MASKING FOR SPARSIFICATION IN MACHINE LEARNING

INTRODUCTION

Aspects of the present disclosure relate to feature masking in machine learning.

Many machine learning architectures involve extraction and analysis (guided by trained parameters) of the features of input data. A wide variety of machine learning models rely on such feature extraction for performing useful tasks, such as classification. However, not all features are equally useful. That is, though the model can learn to extract relevant features, it is common for some subset of the learned features to have little or no use in performing the desired task. There is therefore a need for ways to identify and/or select the useful features (such as through masking), thereby improving the efficiency of the architecture without unduly harming performance of the model.

Accordingly, techniques are needed for improved feature masking.

BRIEF SUMMARY

One aspect provides a method, comprising: accessing a feature tensor in a neural network; generating a feature mask by processing the feature tensor using a masking subnetwork, wherein the masking subnetwork was trained based at least in part on a polarization constraint and an activation constraint to generate feature masks; generating a masked feature tensor based on the feature tensor and the feature mask; and generating an output inference using the neural network based at least in part on the masked feature tensor.

Other aspects provide processing systems configured to perform the aforementioned method as well as those described herein; non-transitory, computer-readable media comprising instructions that, when executed by a processor of a processing system, cause the processing system to perform the aforementioned method as well as those described herein; a computer program product embodied on a computer-readable storage medium comprising code for performing the aforementioned method as well as those further described herein; and a processing system comprising means for performing the aforementioned method as well as those further described herein.

The following description and the related drawings set forth in detail certain illustrative features of one or more aspects.

BRIEF DESCRIPTION OF THE DRAWINGS

The appended figures depict certain aspects of the one or more aspects and are therefore not to be considered limiting of the scope of this disclosure.

FIG. 5 depicts an example flow diagram illustrating a method for generating inferences based on masked feature tensors.

FIG. 6 depicts an example processing system configured to perform various aspects of the present disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
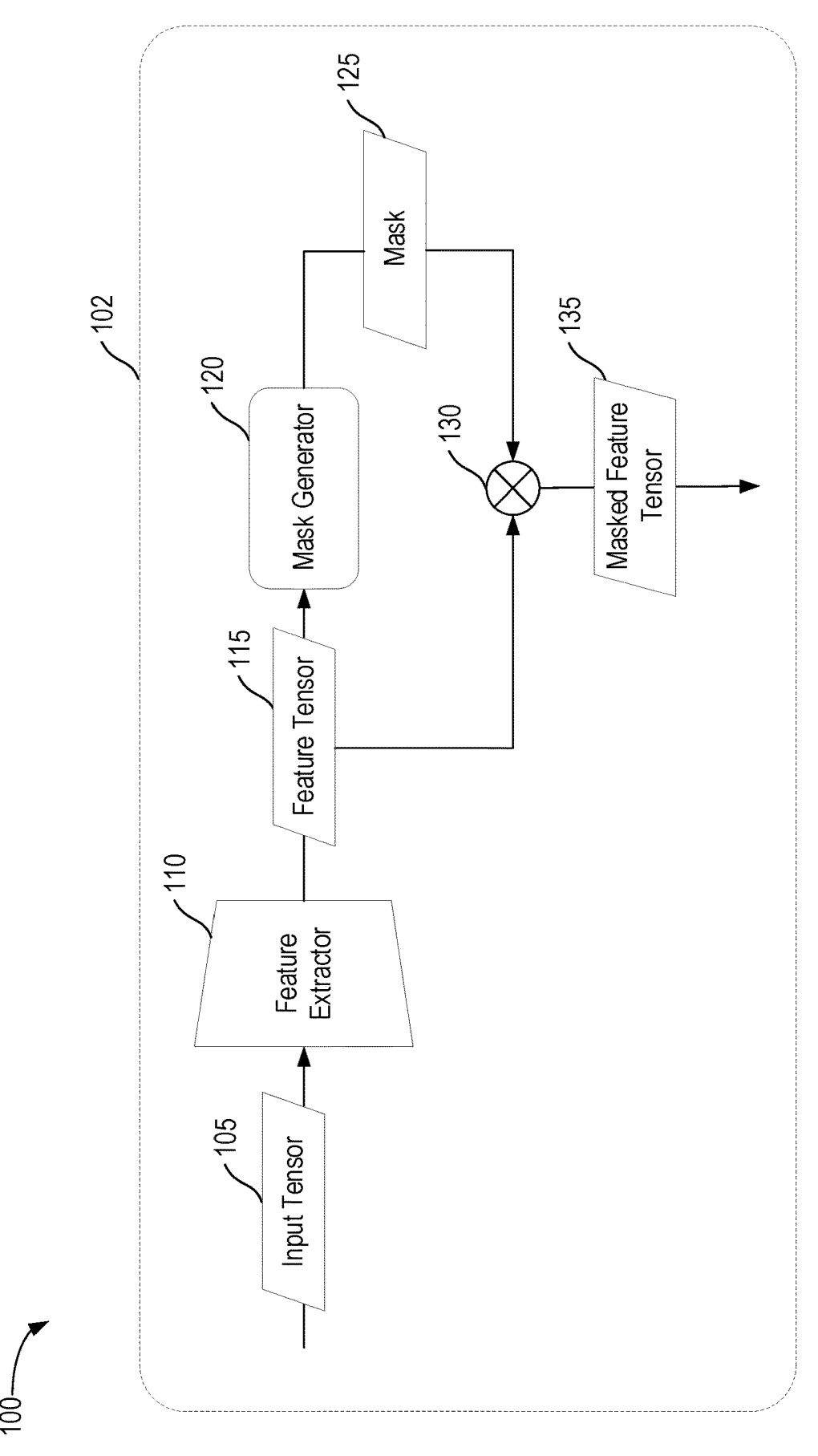
FIG. 1 depicts an example workflow for constrained feature masking using a trained mask generator.

Aspects of the present disclosure provide techniques for improved feature masking using constrained and trained mask generators. In some aspects, the feature masks are said to be "constrained" to indicate that the feature masks are generated by a component that is trained using one or more constraints, such as a polarization constraint and/or activation constraint, as discussed in more detail below.

Some architectures and systems use feature masking, which generally involves analyzing only a subset of the features, to select only the relevant features for a task. This can help in efficient computations, removal of spurious features, prevention of overfitting, and/or for diagnostic and model accuracy purposes.

In some systems, deep-learning-based feature masking has been introduced in some architectures (e.g., for some computer vision tasks, such as occlusion masking used in optical flow estimation, three-dimensional scene flow estimation, depth estimation, and the like) to sparsify the models. As used herein, "sparsification" or "sparsifying" may generally refer to the process of reducing the density of the features or data, or otherwise softening (e.g., reducing extrema) or reducing the values in the data (e.g., where applying a mask causes some values to be replaced with zeros, or with values nearer to zero). Using a learning-based masking approach can create selectivity and/or sparsification in network features. However, while learning-based feature masking is useful, conventional approaches involve indirect and cumbersome techniques, such as the Gumbel-softmax trick or technique, for neural networks to learn and adapt over epochs of training.

Moreover, some techniques for learning-based masking are generally based at least in part on randomness, and are not flexible enough to support additional constraints, regularization, and/or loss terms in training. That is, such approaches are non-deterministic (e.g., where a sigmoid operation of masking is augmented with random noise, and the corresponding temperature scale is passed through an annealing scheme).

Generally, in aspects of the present disclosure, a mask generator (or module) is used to provide constrained feature masking. The mask generator may be an individual model, or a sub-model (or sub-network) of an existing model, configured to generate feature masks as described herein. In particular, mask generators process input feature maps and output feature masks that, when applied to the input feature map itself, generate masked features that are propagated to downstream components (e.g., to the next layer in the neural network). In some aspects, a network and a mask generator are trained end-to-end using a loss function having multiple components (e.g., multiple loss terms), including a task loss (specific to the underlying computational task, such as image segmentation) as well as constraints on the masking (such as to control the polarization and activation rates).

Feature masks generated according to aspects described herein may include many beneficial features as compared to conventional masking approaches, including elimination of inherent randomness and increased flexibility, such as by allowing the activation rate and the polarization of the mask to be controlled using hyperparameters or learned parameters. In some aspects of the present disclosure, this flexibility can be achieved using various constraints and additional loss functions during training, which improves model performance.

The improved feature masking described in the present disclosure can improve machine learning in a wide variety of ways. For example, the learning-based feature masking described herein enables more efficient computation, as the masking allows the model to select a subset of features, allowing for faster computation with reduced computational resources. These improvements are particularly effective for dense prediction tasks (e.g., tasks that involve processing significant data, such as to generate pixel-level predictions), such as for optical flow, segmentation, and the like.

Additionally, in some aspects, the techniques described herein can be used for adaptive computation, enabling dynamic selection of network modules based on available computational resources (e.g., a memory, power, and/or compute budget). For example, in systems with limited computational resources available for training and/or using machine learning models, the polarization rate and/or activation rate can be defined so as to reduce the computational load to fit within the available resources. In some aspects, the polarization rate and activation rate can be defined differently at different points in the model (e.g., at different layers in a neural network), thereby enabling dynamic and adaptive resource usage.

In an aspect, the activation rate constraint can generally control the amount of the feature tensor that is masked (e.g., whether to mask 40% of the feature tensor or 70%). The polarization constraint may generally affect the discreteness or hardness of the values of the mask. For example, higher polarization rates may result in generation of masking values closer to their extrema (e.g., closer to zero and one, with few or no values near the middle of the range, resulting in a highly polarized or sharp edge to the mask), while lower polarizations result in more balanced distributions (with more values further from the ends of the range, resulting in a softer masking/a mask with softer edges).

In some aspects, the learned masking techniques enable improved feature selection, where the most relevant features are selected for the particular task (and others may be masked, ignored, or otherwise not used). As a result, aspects of the present disclosure can prevent irrelevant features from interfering in recognition/inferencing.

Additionally, aspects of the present disclosure can enable improved model personalization (e.g., for speaker-verification or anti-spoofing). That is, in some aspects, pre-trained models may be rapidly adapted to a new domain (e.g., to a new speaker) using few samples from a new data distribution. The masking techniques described herein can reduce the feature dimension complexity and help to prevent or reduce overfitting for these model adaptations.

Further yet, aspects of the present disclosure can enable improved interpretability. For example, because masking enables the model to select regions in input feature maps that influence a certain model output (e.g., an inference, such as a classification), masking can serve as a diagnostic tool to find reasoning behind the model output, such as what features are dominant when reaching a model output.

Further, by controlling the polarization constraint, soft values can be obtained to be used for improved uncertainty measurement. For example, soft (i.e., continuous) values (e.g., those between zero and one) may carry more information than the discrete extreme values (e.g., zero and one). In some aspects, therefore, such soft values can not only serve the purpose of masking (e.g., by rounding the soft values to the nearest value of zero or one), but such soft values can also be used as the confidence (or certainty) of the mask. For example, both 0.98 and 0.53 may be rounded to one, resulting in the mask having a value of "one" in that position (thereby not masking the underlying tensor). However, 0.98 may be used to indicate a significantly higher confidence than 0.53 (e.g., a higher confidence that the pixel should not be masked), even though both have the same result.

Additionally, in federated learning implementations, user-specific masks can be generated to obtain the relevant features for a particular user (allowing the system to ignore or mask features that are not relevant, or are less relevant, for the user). That is, each user may train and use a specific mask generator locally based on local training data. These user-specific mask generators can therefore generate user-specific masks, allowing each user to identify the specific features that are relevant for the user's particular dataset.

Example Workflow for Constrained Feature Masking

FIG. 1 depicts an example workflow 100 for constrained feature masking using a trained mask generator. In the illustrated example, the workflow 100 is performed by a machine learning system 102. The machine learning system 102 may generally correspond to a physical or virtual computing device (e.g., hardware and/or software) that is configured to use machine learning model(s), such as neural networks, to generate output inferences. That is, the machine learning system 102 may process input data using one or more neural networks to generate inferences, which may be used for a variety of tasks depending on the particular implementation.

The depicted workflow 100 generally corresponds to a single portion of the model (e.g., a feature extraction stage). That is, the feature extractor 110, mask generator 120, and operation 130 may be used as part of the feature extraction stage of a model (e.g., a neural network), and there may be any number of operations performed prior to the workflow 100 (e.g., to generate input to the workflow 100 and/or machine learning model) as well as any number of operations performed after the workflow 100 (e.g., to generate an output inference using remaining portions of the model).

In the illustrated workflow 100, an input tensor 105 is processed by a feature extractor 110 to generate a feature tensor 115 (also referred to in some aspects as a feature map). Generally, the feature extractor 110 can correspond to one or more layers in a neural network used to extract features from the input data (e.g., a ResNet backbone). The input tensor 105 may include output data from a prior layer (e.g., a set of activations from a prior layer), or may include original input to the model (e.g., where the feature extractor 110 is the first or initial component of the model).

As illustrated, the feature tensor 115 is then processed by a mask generator 120 to generate a mask 125 (sometimes referred to as a feature mask). Although the illustrated example depicts the mask generator 120 operating on a feature tensor 115 (generated by a feature extractor 110), the mask generator 120 can generally process any tensor (e.g., the input tensor 105) to generate a corresponding tensor mask, and need not operate only on feature tensors 115 (generating feature masks) depending on the particular implementation.

In some aspects, the mask generator 120 generally corresponds to one or more layers of a neural network. During training, the mask generator 120 learns to generate masks 125 based on input feature tensors 115. As discussed in more detail below, the mask generator 120 may be trained with one or more constraints, such as an activation rate constraint and/or a polarization constraint.

As discussed above, the activation rate constraint can generally control the amount of the feature tensor 115 that is masked (e.g., whether to mask 40% of the feature tensor 115 or 70%). The polarization constraint may generally affect the discreteness or hardness of the values of the mask 125. For example, higher polarization rates may result in generation of masking values closer to their extrema (e.g., closer to zero and one, with few or no values near the middle of the range), while lower polarizations result in more balanced distributions (with more values further from the ends of the range).

In some aspects, the mask 125 generally has the same size and/or dimensionality as the feature tensor 115. The values in the mask 125 indicate whether to mask the corresponding element in the feature tensor 115, and/or how much the element should be masked.

In some aspects, a binary mask is used, where all entries (e.g., elements) in the mask have binary values of either zero or one. These binary values may be derived directly from the polarization constraint, or, in some cases, derived by rounding "soft" values (e.g., continuous values between zero and one), as discussed above. In some aspects, regardless of whether the mask is soft (e.g., non-binary), the system can perform element-wise multiplication between the feature tensor and the mask (as the mask tensor has same shape and dimensionality as the feature tensor) to yield the masked feature tensor. For soft masks, this may result in partially masked elements (e.g., multiplying an element in the feature tensor by a value of 0.75, thereby partially masking the element). In extreme cases for soft masks (e.g., where the mask element is zero or one), the mask acts as a binary mask. A binary mask can be similarly applied, where a mask value of one causes the feature to be passed through unchanged, and a mask value of zero causes the corresponding feature to be completely masked out. As discussed above, this masking may be referred to as sparsification in some aspects.

In the depicted workflow 100, the mask 125 and feature tensor 115 are both input to an operation 130 to generate a masked feature tensor 135. In some aspects, the operation 130 is an element-wise product operation. That is, the operation 130 may include multiplying each element in the feature tensor 115 with a corresponding element in the mask 125.

The masked feature tensor 135 can then be output for downstream processing. In some aspects, outputting the masked feature tensor 135 includes providing the masked feature tensor 135 as input to an activation function, and/or as input to a subsequent layer or component in the machine model (e.g., the neural network or other model that uses the depicted feature extraction stage) to generate an output inference. In some aspects, outputting the masked feature tensor 135 includes returning the masked feature tensor 135 as final output from the model. Additionally, though not depicted in the illustrated example, in some aspects, the mask 125 can itself be used as output from the model. For example, the specific model to which the mask generator 120 belongs may be used to generate the mask 125, and another module (e.g., another neural network) may utilize the generated mask 125 to perform further processing.

As discussed above, the mask generator 120 can thereby improve the efficiency and operations of the model, at least through reduced computational expense, improved model accuracy, and the like. For example, downstream layers or other components may be able to process less data such as by processing smaller tensors corresponding to the selected features, or by avoiding or refraining from performing computation involving the portion(s) of the feature tensor that is masked.

Example Workflow for Training Constrained Mask Generators

Figure 2:
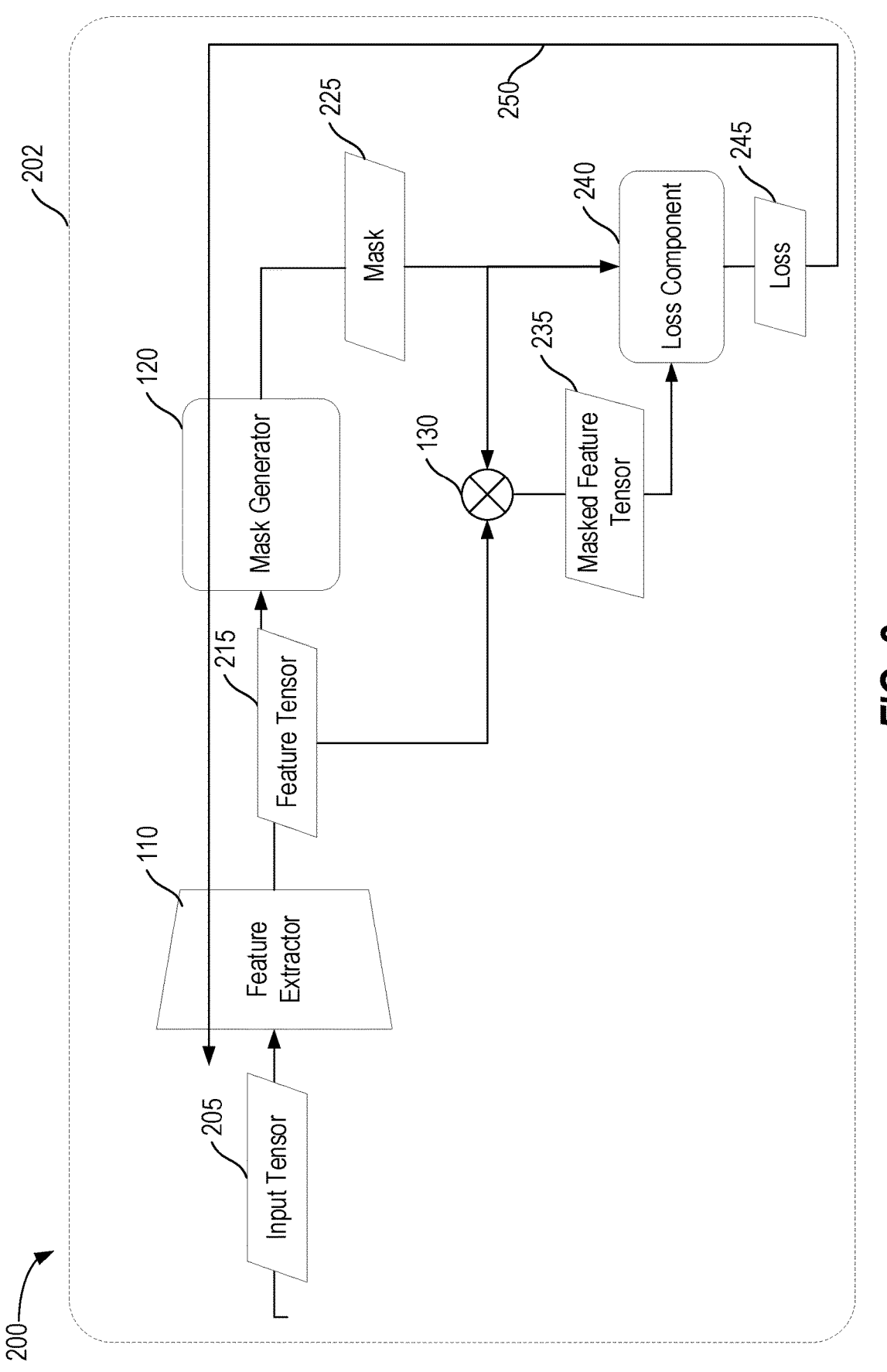
FIG. 2 depicts an example workflow for training a mask generator for constrained feature masking.

FIG. 2 depicts an example workflow 200 for training a mask generator for constrained feature masking. In the illustrated example, the workflow 200 is performed by a machine learning system 202. The machine learning system 202 may generally correspond to a physical or virtual computing device (e.g., hardware and/or software) that is configured to train machine learning model(s), such as neural networks, including one or more mask generators, such as 120. That is, the machine learning system 202 may use training data to generate losses, which are then used to refine the model (including one or more mask generators, such as 120).

The depicted workflow 200 generally corresponds to a single portion of the model. That is, there may be any number of operations performed prior to the workflow 200 (e.g., to generate input to the workflow 200) as well as any number of operations performed after the workflow 200 (e.g., to generate an output inference, and to refine the model). In some aspects, the machine learning system 202 is the same system as the machine learning system 102, discussed above with reference to FIG. 1. In other aspects, the machine learning system 102 and machine learning system 202 may be different and discrete systems or components. That is, the workflow 100 of FIG. 1 (corresponding to use of a trained model, including one or more mask generators) and the workflow 200 (corresponding to training the model, including one or more mask generators) may be performed on the same system or device, or may be performed on separate systems.

In the illustrated workflow 200, during training, an input tensor 205 is processed by a feature extractor 110 (which may correspond to the feature extractor 110 of FIG. 1) to generate a feature tensor 215. As discussed above, the feature extractor 110 can generally correspond to one or more layers in a neural network. Similarly to the input tensor 105 of FIG. 1, the input tensor 205 may include output data from a prior layer (e.g., a set of activations from a prior layer), or may include original input to the model (e.g., where the feature extractor 110 is the first or initial component of the model).

As illustrated and as discussed above, the feature tensor 215 is then processed by a mask generator 120 (which may correspond to mask generator 120 of FIG. 1) to generate a corresponding mask 225. Although the illustrated example depicts the mask generator 120 operating on the feature tensor 215 (generated by a feature extractor 110), the mask generator 120 can generally process any tensor (e.g., the input tensor 205), and need not operate only on feature tensors 215 depending on the particular implementation.

As illustrated, the mask 225 and feature tensor 215 are combined by operation 130 (e.g., element-wise multiplication) to yield a masked feature tensor 235. As discussed above with reference to FIG. 1, during inferencing, the masked feature tensor 235 can be provided to one or more subsequent components (e.g., a subsequent layer in the model). In some aspects, the masked feature tensor 135 can similarly be provided to the downstream component(s) during training, such as during a forward pass of the training process.

Additionally, during training, the masked feature tensor 235 and mask 225 can be processed by a loss component 240 to generate a loss 245 for the model. Although depicted as a discrete component for conceptual clarity, in aspects, the operations of the loss component 240 can be implemented in a variety of ways using hardware, software, or a combination of hardware and software.

In some aspects, the loss 245 can include multiple components of loss. In at least one aspect, the loss component 240 can generate a task loss based at least in part on the masked feature tensor 235. For example, the masked feature tensor 235 can be used to generate an output inference (potentially through one or more downstream layers of the model), and this inference can be compared to a ground-truth label for the input sample (e.g., using cross-entropy loss). This task loss can then be backpropagated through the model (including through the mask generator 120 and feature extractor 110) to refine the weights and/or biases. In at least one aspect, the task loss is defined as $L_{task}(f')$, where $L_{task}$ is any suitable loss function, such as cross-entropy loss, and f' is the masked feature tensor 235, which may in turn be defined as $f'=m*f$, where m is the mask 225, f is the feature tensor 215.

Additionally, to provide one or more constraints on the mask generator 120, the loss component 240 may use the mask 225 to generate an activation loss and/or a polarization loss. As discussed above, the polarization loss can affect how extreme the generated values for the mask 225 are. In at least one aspect, the polarization loss for a mask m is defined using equation 1 below, where E[·] is the expectation or expected value of ·. In this way, the polarization loss is defined based on the expectation of the product of the mask 225 (m) and the inverse of the mask 225 (1−m).

$$L_{pol}(m)=E[m(1-m)] \tag{1}$$

In some aspects, the activation loss can generally affect how much of the feature tensor is masked. In at least one aspect, the activation loss for a mask m is defined using equation 2 below, where a is the activation rate (which may be a defined hyperparameter or a learned parameter). In this way, the activation loss is defined based on the activation rate and the expectation of the mask 225 (m).

$$L_{act}(m)=(E[m]-a)^2 \tag{2}$$

In some aspects, the loss 245 is computed by using a weighted sum of the individual loss components. For example, the overall loss 245 may be defined as $L_{total}=\lambda_{pol}L_{pol}+\lambda_{act}L_{act}+\lambda_{task}L_{task}$, where $\lambda_{pol}$, $\lambda_{act}$, and $\lambda_{task}$ are the defined weights. In aspects, these loss weights may be defined hyperparameters, or may be learned during training. Modifying each of these weights can have varying effects on the mask generator 120. For example, increasing the weight of the polarization constraint can increase the polarization (e.g., the discreteness or hardness) of the generated masks 225. In some aspects, the "hardness" or "discreteness" of the mask can be used to describe the polarization, in that more polarized values (also referred to as more hard values) are also more discrete (e.g., closer to zero and one), while less polarized values (e.g., in the case of a soft mask) may be generally further from the discrete ends of the range (e.g., further from zero and one).

In some aspects, only two loss weights can be used, as controlling the weight of any two loss components may affect the contribution of the third, thereby implicitly defining a weight of the third.

In some aspects, the loss weights and/or activation rate can be modified during training. That is, the activation rate, weightage of the polarization constraint, and/or weightage of the activation rate constraint can be varied during training (e.g., using different values at different stages of training). For example, depending on the changes in loss values seen across different epochs, these hyperparameters may be reconfigured. Similarly, the activation rate need not be fixed, and can be varied throughout training depending on feedback from the task loss values.

As an example, if a particular loss term (e.g., the activation loss, polarization loss, or task loss) is relatively high, the system may increase the weight coefficient on the particular loss term so that the loss term has more importance during training, resulting in this particular loss being decreased more rapidly over training rounds or epochs. This can allow each loss term to eventually have similar values (e.g., to be at a similar scale). In some aspects, the activation rate can also be varied (e.g., if the observed activation rate differs from the desired one). For example if the preferred activation rate is 0.1 but the observed activation rate of generated masks is 0.05, the activation rate or weight can be increased to compensate.

In some aspects, the output of the mask generator 120 is generated by a sigmoid function, and the system may use a temperature hyperparameter to control discreteness of the masks 225, which may have a similar effect to changing the weightage of the polarization constraint. As discussed above, the discreteness of the mask can generally refer to how close the mask values are zero or one. If the values are close to either extrema, the mask is said to be more discrete or polarized. In some aspects, high temperature means the mask is less discrete (e.g., closer to the middle values, such as 0.5). In some aspects, therefore, the temperature can be controlled using the weight of the polarization loss term, such as by observing the average polarization/discreteness of the outputs, and adjusting the weight accordingly.

In aspects, the mask generator 120 can generally be applied to one or more layers of the model. That is, a separate mask generator 120 may be trained and used for each layer, of a set of multiple layers, depending on the computation limits of the system.

Additionally, in some aspects, multi-level masking (rather than binary masking) can be used to enable multiple levels of selection by using multi-hot encoding, and polarization constraints on each dimension. For example, rather than binary masking (with two states: zero and one), the mask may include multiple states (e.g., four, which may be encoded as [0,0], [0,1], [1,0], [1,1]). To allow for such multiple states, in some aspects, the system may use additional dimensions in the mask (e.g., two dimensions in this example). In such an aspect, the polarization constraint(s) can be applied to multiple (e.g., two) dimensions as well.

As discussed above, in an aspect, the mask generator 120 and feature extractor 110 are generally trained end-to-end using the loss 245 (e.g., by a training or update component), as depicted by the arrow 250. That is, the loss 245 may be backpropagated (e.g., through one or more downstream layers), through the mask generator 120, and then through the feature extractor 110. This enables joint training of the feature extractor 110 and mask generator 120, thereby resulting in improved model performance and accuracy.

Example Method for Constrained Feature Masking

Figure 3:
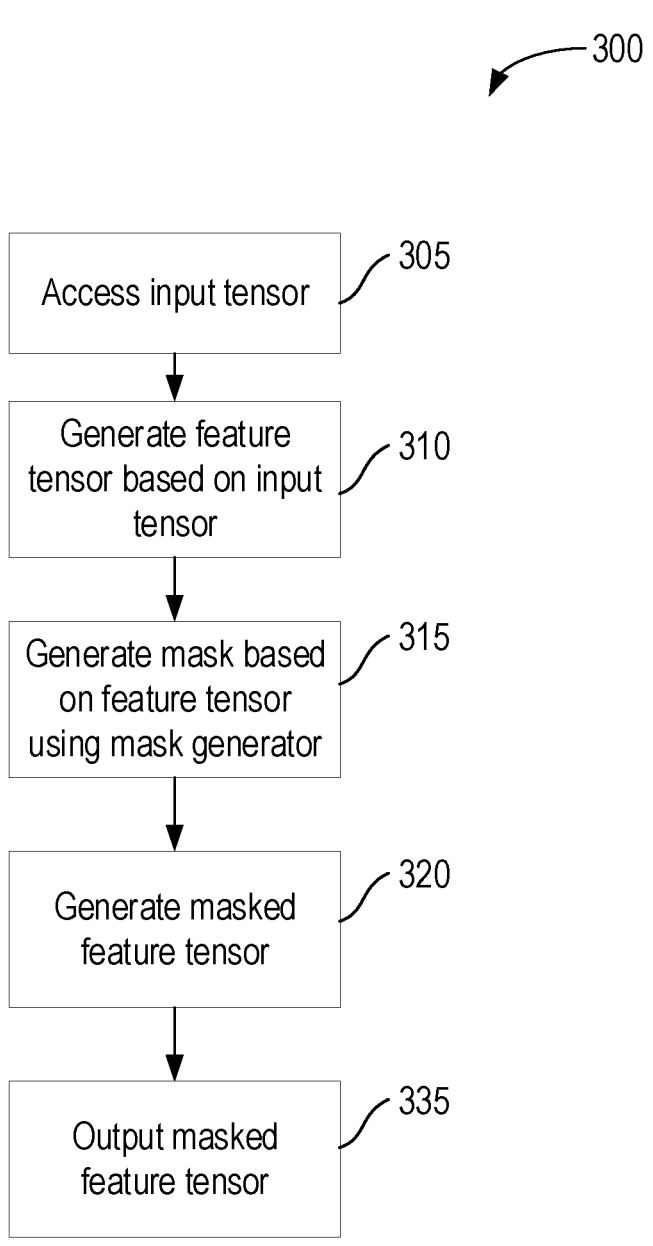
FIG. 3 depicts an example flow diagram illustrating a method for generating a constrained feature mask.

FIG. 3 depicts an example flow diagram illustrating a method 300 for generating a feature mask. In some aspects, the method 300 provides additional detail for the workflow 100, discussed above with reference to FIG. 1. In some aspects, the method 300 is performed by a machine learning system, such as the machine learning system 102 of FIG. 1.

At block 305, an input tensor (e.g., input tensor 105 of FIG. 1) is accessed for processing. As used herein, "accessing" data (such as the input tensor) can generally include receiving the data, requesting the data, retrieving the data (e.g., from memory or storage), and the like. As discussed above, the input tensor can generally have any size and dimensionality depending on the particular implementation. That is, the received input tensor may have any height and width, as well as any channel depth. In some aspects, the input tensor is the output from a prior layer in a neural network (e.g., a set of activations). In some aspects, the input tensor is original input to the neural network (e.g., an image).

At block 310, the input tensor is used to generate a feature tensor (such as feature tensor 115 of FIG. 1). For example, the input tensor may be processed using a feature extractor (e.g., feature extractor 110 of FIG. 1). As discussed above, in some aspects generating the feature tensor includes processing the input tensor using one or more layers of a neural network. The feature tensor can generally have any dimensionality and size, depending on the particular implementation.

At block 315, the feature tensor is then used, by a mask generator (e.g., mask generator 120 of FIG. 1) to generate a mask (such as mask 125 of FIG. 1). As discussed above, in some aspects, the mask generator may generate the mask based on an input tensor rather than a feature tensor. That is, block 310 may be skipped in some aspects. Such a mask may be used to mask the input tensor itself, or to mask a generated feature tensor (potentially with use of convolution or other operations to ensure the mask is the same size as the feature tensor).

In an aspect, the mask generator corresponds to one or more layers of a neural network. In some aspects, the mask generator may be referred to as a subnet or subnetwork of a larger neural network. As discussed above and in more detail below with reference to FIG. 4, the mask generator may be trained using one or more constraints (e.g., relating to polarization and/or activation rate) to enable improved and dynamic masking.

In some aspects, the mask is represented using a tensor having the same size and/or dimensionality as the feature tensor (or input tensor, if the input tensor is used to generate the mask), where each element in the mask has a corresponding element in the feature tensor. Generally, the value of each element in the mask indicates whether the corresponding element in the feature tensor should be masked or not. In some aspects, the mask is a binary tensor, where a value of zero may indicate that the corresponding feature element should be masked, and a value of one may indicate that the corresponding feature element should not be masked. In other aspects, the mask may be non-binary, as discussed above.

At block 320, the mask and feature tensor are used to generate a masked feature tensor (such as masked feature tensor 135 of FIG. 1). For example, the feature mask and feature tensor may be combined using an element-wise multiplication (e.g., using operation 130 of FIG. 1), where each element in the feature tensor is multiplied by the corresponding element in the mask. In an aspect, the masked feature tensor can therefore have the same size as the feature tensor and mask. In aspects that use the input tensor to generate the mask, the system may generate a masked input tensor by combining the input tensor and resulting mask (e.g., using element-wise multiplication).

At block 335, the masked feature tensor is then output for any downstream processing. For example, in some aspects, the masked feature tensor is processed using an activation function. In some aspects, the masked feature tensor is output to be used as input to a subsequent layer in the neural network. The subsequent layer(s) can use this masked feature tensor to generate an output inference for the neural network. In at least one aspect, the masked feature tensor is itself used as output from the neural network.

Although the depicted method 300 includes generation of a single mask, in some aspects, the neural network can include multiple mask generation stages. That is, multiple layers of the neural network may each include a respective mask generator to generate a corresponding mask for the particular layer.

Note that FIG. 3 is just one example of a method, and other methods including fewer, additional, or alternative steps are possible consistent with this disclosure.

Example Method for Training Mask Generators for Constrained Feature Masking

Figure 4:
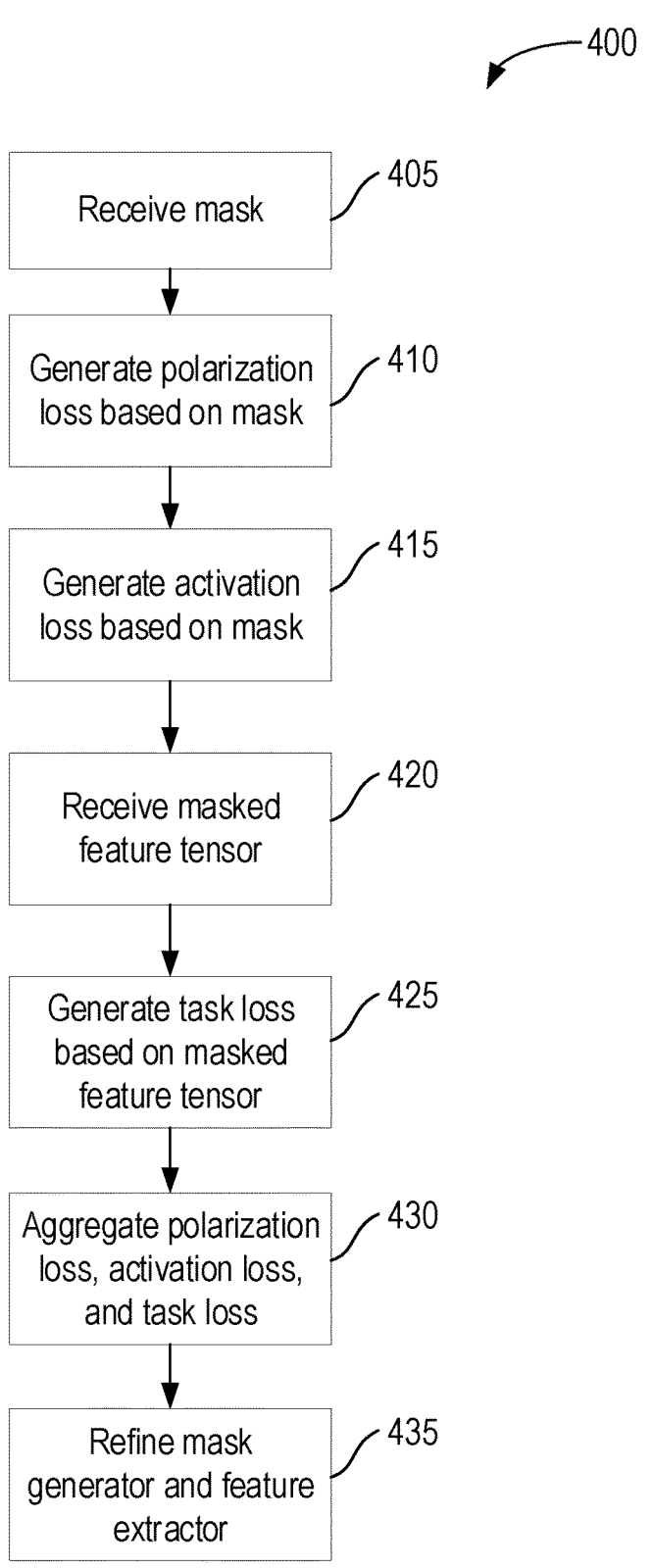
FIG. 4 depicts an example flow diagram illustrating a method for training a mask generator for constrained feature mask generation.

FIG. 4 depicts an example flow diagram illustrating a method 400 for training a mask generator for constrained feature mask generation. In some aspects, the method 400 provides additional detail for the workflow 200, discussed above with reference to FIG. 2. In some aspects, the method 400 is performed by a machine learning system, such as the machine learning system 202 of FIG. 2.

At block 405, a mask (e.g., mask 225 of FIG. 2) is received for processing. In some aspects, the mask is received by a loss component (e.g., loss component 240 of FIG. 2) that generates a training loss to refine the mask generator and/or neural network. In an aspect, the mask can be generated during a forward pass of training the mask generator and/or broader neural network. For example, a training sample can be used as input to the network during the forward pass, resulting in generation of the mask (e.g., after feature extraction).

At block 410, the loss component generates a polarization loss based on the generated mask. For example, as discussed above with reference to FIG. 2, the loss component may generate the polarization loss based on the expected value of the product of the mask and the inverse of the mask. That is, the loss component may determine the inverse of the mask, multiply this inverse with the mask itself, and then compute the expected value of the resulting product (e.g., using equation 1, above). As discussed above, the polarization loss can generally be used to affect how polarized the mask is.

At block 415, the loss component generates an activation loss based on the mask. In some aspects, as discussed above, the activation loss is generated based on the mask and a defined activation rate (which may be a configurable hyperparameter). In at least one aspect, as discussed above, the activation loss may be computed based on a computed expected value of the mask and the defined activation rate (e.g., using equation 2 above). As discussed above, the activation loss can generally be used to affect what percentage or amount of the feature tensor is masked (e.g., how many non-zero elements the generated mask contains).

At block 420, the loss component can receive the masked feature tensor that was generated using the mask received at block 405. That is, the masked feature tensor may have been generated by computing an element-wise multiplication of the feature tensor and the mask.

At block 425, the loss component generates the task loss based at least in part on the masked feature tensor. In some aspects, this masked feature tensor is directly used to compute a task loss. In other aspects, the masked feature tensor is used to generate an output inference (e.g., through one or more subsequent layers of the model), and the task loss can be computed based on this resulting inference. In some aspects, the task loss is generated based on a cross-entropy function (e.g., based on the difference between an output inference generated using the masked feature tensor, and a ground-truth label for the input data that was used to generate the inference).

At block 430, the loss component can aggregate the polarization loss, activation loss, and task loss. For example, using a weighed sum (where two or more of the loss components have a corresponding weight), the loss component can aggregate the losses to generate an overall loss for the mask generator/neural network. As discussed above, these weights may be configurable hyperparameters (which may change during training), or maybe learned weights. Generally, adjusting these weights can affect the polarization of the generated masks and/or the activation rates.

At block 435, the total loss is used to refine the mask generator (e.g., via backpropagation). In some aspects, the total loss is also used to refine the prior layer(s) of the model, such as the feature extractor (e.g., feature extractor 110 of FIG. 2). In some aspects, as discussed above, the feature extractor and mask generator are refined end-to-end, such that the loss is propagated through the mask generator and then through the feature extractor.

Although the illustrated example suggests a sequential process for conceptual clarity, in some aspects, the operations may be performed in different orders, and may be performed entirely or partially in parallel. For example, in some aspects, blocks 410, 415, and 425 may be performed in parallel. As discussed above, although the depicted method 400 includes generation of a polarization loss and activation loss based on a single mask, in some aspects, the neural network can include multiple mask generation stages. That is, multiple layers of the neural network may each include a respective mask generator to generate a corresponding mask for the particular layer. In some such aspects, the loss component can similarly generate a respective polarization loss, activation loss, and/or task loss for each such mask generator. In at least one aspect, the system generates respective polarization losses and activation losses for each mask generator, and an overall task loss based on the eventual output of the model.

In some aspects, if each mask generator provides the masking operation for a respective layer, the losses can all be summed up for all the loss terms and all the layers. In at least one aspect, for intermediate layers (e.g., any layers before the final layer(s) that generate the output of the model), the cross entropy or any other task loss is not used, and only the masking constraints or losses are used to refine these intermediate layers. In one such aspect, the task loss is used only to refine the final output layer(s). In some aspects, using backpropagation, the loss terms for a particular layer will affect only that particular layer, as well as the layers that are shallower (e.g., prior to that layer) in the model. That is, the loss terms from a given layer will not be used to modify any downstream layers.

Additionally, though the illustrated example depicts refining the mask generator and feature extractor using a single mask generated using a single input exemplar (e.g., using stochastic gradient descent), in aspects, the machine learning system may instead use batches of input data to refine the model parameters (e.g., using batch gradient descent), using the method 400 to process multiple exemplars.

Note that FIG. 4 is just one example of a method, and other methods including fewer, additional, or alternative steps are possible consistent with this disclosure.

Example Method for Machine Learning Using Constrained Masking

FIG. 5 depicts an example flow diagram illustrating a method for generating inferences based on masked feature tensors. In an aspect, the method 500 may be performed by a machine learning system, such as the machine learning system 102 of FIG. 1 and/or the machine learning system 202 of FIG. 2.

At block 505, a feature tensor (e.g., feature tensor 115 of FIG. 1) is accessed in a neural network.

At block 510, a feature mask (e.g., mask 125 of FIG. 1) is generated by processing the feature tensor using a masking subnetwork (e.g., mask generator 120 of FIG. 1), wherein the masking subnetwork was trained based at least in part on a polarization constraint and an activation constraint to generate feature masks.

At block 515, a masked feature tensor (e.g., masked feature tensor 135 of FIG. 1) is generated based on the feature tensor and the feature mask.

At block 520, an output inference is generated using the neural network based at least in part on the masked feature tensor.

In some aspects, generating the output inference comprises outputting the masked feature tensor to a subsequent layer in the neural network.

In some aspects, generating the output inference is performed while processing input data during a runtime phase of the neural network.

In some aspects, generating the output inference is performed while processing training data during a training phase of the neural network.

In some aspects, the method 500 further includes generating a polarization loss based at least in part on the feature mask and refining one or more parameters of the masking subnetwork based on the polarization loss.

In some aspects, the polarization loss is generated based at least in part on an expectation of a product of the feature mask and an inverse of the feature mask.

In some aspects, the method 500 further includes generating an activation loss based at least in part on the feature mask and refining one or more parameters of the masking subnetwork based further on the activation loss.

In some aspects, the activation loss is generated based at least in part on an expectation of the feature mask and an activation rate, wherein the activation rate is a hyperparameter that controls what percentage of the feature tensor is masked.

In some aspects, the method 500 further includes generating a task loss based at least in part on the masked feature tensor, and refining the one or more parameters of the masking subnetwork based further on the task loss.

In some aspects, the method 500 further includes, prior to refining the one or more parameters of the masking subnetwork, aggregating the polarization loss, activation loss, and task loss using a set of defined weights, wherein the set of defined weights control polarization of the feature mask.

In some aspects, the method 500 further includes refining one or more prior layers of the neural network (e.g., the feature extractor 110 of FIG. 1) based at least in part on the polarization loss, activation loss, and task loss.

Note that FIG. 5 is just one example of a method, and other methods including fewer, additional, or alternative steps are possible consistent with this disclosure.

Example Processing System for Constrained
Feature Masking

In some aspects, the workflows, techniques, and methods described with reference to FIGS. 1-5 may be implemented on one or more devices or systems. FIG. 6 depicts an example processing system 600 configured to perform various aspects of the present disclosure, including, for example, the techniques and methods described with respect to FIGS. 1-5. In one aspect, the processing system 600 may correspond to a machine learning system that trains and/or uses machine learning models, including mask generators, such as the machine learning system 102 of FIG. 1 and/or the machine learning system 202 of FIG. 2. In at least some aspects, as discussed above, the operations described below with respect to the processing system 600 may be distributed across any number of devices.

Processing system 600 includes a central processing unit (CPU) 602, which in some examples may be a multi-core CPU. Instructions executed at the CPU 602 may be loaded, for example, from a program memory associated with the CPU 602 or may be loaded from a memory 624.

Processing system 600 also includes additional processing components tailored to specific functions, such as a graphics processing unit (GPU) 604, a digital signal processor (DSP) 606, a neural processing unit (NPU) 608, a multimedia processing unit 610, and a wireless connectivity component 612.

An NPU, such as NPU 608, is generally a specialized circuit configured for implementing control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPUs), neural network processor (NNP), intelligence processing unit (IPU), vision processing unit (VPU), or graph processing unit.

NPUs, such as NPU 608, are configured to accelerate the performance of common machine learning tasks, such as image classification, machine translation, object detection, and various other predictive models. In some examples, a plurality of NPUs may be instantiated on a single chip, such as a system on a chip (SoC), while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process the new piece of data through an already trained model to generate a model output (e.g., an inference).

In one implementation, NPU 608 is a part of one or more of CPU 602, GPU 604, and/or DSP 606.

In some examples, wireless connectivity component 612 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity component 612 is further connected to one or more antennas 614.

Processing system 600 may also include one or more sensor processing units 616 associated with any manner of sensor, one or more image signal processors (ISPs) 618 associated with any manner of image sensor, and/or a navigation component 620, which may include satellite-based positioning system components (e.g., GPS or GLONASS) as well as inertial positioning system components.

Processing system 600 may also include one or more input and/or output devices 622, such as screens, touch-sensitive surfaces (including touch-sensitive displays), physical buttons, speakers, microphones, and the like.

In some examples, one or more of the processors of processing system 600 may be based on an ARM or RISC-V instruction set.

Processing system 600 also includes memory 624, which is representative of one or more static and/or dynamic memories, such as a dynamic random access memory, a flash-based static memory, and the like. In this example, memory 624 includes computer-executable components, which may be executed by one or more of the aforementioned processors of processing system 600.

In particular, in this example, memory 624 includes a feature component 624A, a mask component 624B, and a training component 624C. The memory 624 also includes a set of masking parameters 624D and model parameters 624E. The model parameters 624E may generally correspond to the parameters of all or a part of a machine learning model, such as the weights and/or biases for one or more layers of a neural network. The masking parameters 624D generally correspond to the parameters (or hyperparameters) used to control the masking, such as the activation rate, polarization weightage, and/or activation weightage discussed above. The depicted components, and others not depicted, may be configured to perform various aspects of the techniques described herein. Though depicted as discrete components for conceptual clarity in FIG. 6, feature component 624A, mask component 624B, and training component 624C may be collectively or individually implemented in various aspects.

Processing system 600 further comprises feature circuit 626, mask circuit 627, and training circuit 628. The depicted circuits, and others not depicted, may be configured to perform various aspects of the techniques described herein.

For example, feature component 624A and feature circuit 626 may correspond to the feature extractor 110 of FIGS. 1 and 2, and be used to generate feature tensors or maps based on input data, as discussed above with reference to FIGS.

1-3 and 5. Mask component 624B and mask circuit 627 may correspond to the mask generator 120 of FIGS. 1 and 2, and be used to generate feature masks based on feature tensors, as discussed above with reference to FIGS. 1-3, and 5. Training component 624C and training circuit 628 may correspond to the loss component 240 of FIG. 2, and may be used to compute losses (such as polarization losses, activation losses, and task losses) to refine the machine learning model, as discussed above with reference to FIGS. 2, 4, and 5.

Though depicted as separate components and circuits for clarity in FIG. 6, feature circuit 626, mask circuit 627, and loss circuit may collectively or individually be implemented in other processing devices of processing system 600, such as within CPU 602, GPU 604, DSP 606, NPU 608, and the like.

Generally, processing system 600 and/or components thereof may be configured to perform the methods described herein.

Notably, in other aspects, aspects of processing system 600 may be omitted, such as where processing system 600 is a server computer or the like. For example, multimedia processing unit 610, wireless connectivity component 612, sensor processing units 616, ISPs 618, and/or navigation component 620 may be omitted in other aspects. Further, aspects of processing system 600 maybe distributed between multiple devices.

EXAMPLE CLAUSES

Clause 1: A method, comprising: accessing a feature tensor in a neural network; generating a feature mask by processing the feature tensor using a masking subnetwork, wherein the masking subnetwork was trained based at least in part on a polarization constraint and an activation constraint to generate feature masks; generating a masked feature tensor based on the feature tensor and the feature mask; and generating an output inference using the neural network based at least in part on the masked feature tensor.

Clause 2: The method according to Clause 1, wherein generating the output inference comprises outputting the masked feature tensor to a subsequent layer in the neural network.

Clause 3: The method according to any one of Clauses 1-2, wherein generating the output inference is performed while processing input data during a runtime phase of the neural network.

Clause 4: The method according to any one of Clauses 1-3, wherein generating the output inference is performed while processing training data during a training phase of the neural network.

Clause 5: The method according to any one of Clauses 1-4, further comprising: generating a polarization loss based at least in part on the feature mask; and refining one or more parameters of the masking subnetwork based on the polarization loss.

Clause 6: The method according to any one of Clauses 1-5, wherein the polarization loss is generated based at least in part on an expectation of a product of the feature mask and an inverse of the feature mask.

Clause 7: The method according to any one of Clauses 1-6, further comprising: generating an activation loss based at least in part on the feature mask; and refining one or more parameters of the masking subnetwork based further on the activation loss.

Clause 8: The method according to any one of Clauses 1-7, wherein the activation loss is generated based at least in part on an expectation of the feature mask and an activation rate, wherein the activation rate is a hyperparameter that controls what percentage of the feature tensor is masked.

Clause 9: The method according to any one of Clauses 1-8, further comprising: generating a task loss based at least in part on the masked feature tensor; and refining the one or more parameters of the masking subnetwork based further on the task loss.

Clause 10: The method according to any one of Clauses 1-9, further comprising, prior to refining the one or more parameters of the masking subnetwork, aggregating the polarization loss, activation loss, and task loss using a set of defined weights, wherein the set of defined weights control polarization of the feature mask.

Clause 11: The method according to any one of Clauses 1-10, further comprising refining one or more prior layers of the neural network based at least in part on the polarization loss, activation loss, and task loss.

Clause 12: A system, comprising: a memory comprising computer-executable instructions; and one or more processors configured to execute the computer-executable instructions and cause the processing system to perform a method in accordance with any one of Clauses 1-11.

Clause 13: A system, comprising means for performing a method in accordance with any one of Clauses 1-11.

Clause 14: A non-transitory computer-readable medium comprising computer-executable instructions that, when executed by one or more processors of a processing system, cause the processing system to perform a method in accordance with any one of Clauses 1-11.

Clause 15: A computer program product embodied on a computer-readable storage medium comprising code for performing a method in accordance with any one of Clauses 1-11.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, the term "connected to", in the context of sharing electronic signals and data between the elements described herein, may generally mean in data communication between the respective elements that are connected to each other. In some cases, elements may be directly connected to each other, such as via one or more conductive traces, lines, or other conductive carriers capable of carrying signals and/or data between the respective elements that are directly connected to each other. In other cases, elements may be indirectly connected to each other, such as via one or more data busses or similar shared circuitry and/or integrated circuit elements for communicating signals and data between the respective elements that are indirectly connected to each other.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processor-implemented method of machine learning, comprising:
    accessing a feature tensor in a neural network;
    generating a feature mask by processing the feature tensor using a masking subnetwork, wherein the masking subnetwork was trained based at least in part on a polarization constraint and an activation constraint to generate feature masks;
    generating a polarization loss based at least in part on the feature mask, wherein the polarization loss is generated based at least in part on an expectation of a product of the feature mask and an inverse of the feature mask;
    refining one or more parameters of the masking subnetwork based on the polarization loss;
    generating a masked feature tensor based on the feature tensor and the feature mask; and
    generating an output inference using the neural network based at least in part on the masked feature tensor.

2. The processor-implemented method of claim 1, wherein generating the output inference comprises outputting the masked feature tensor to a subsequent layer in the neural network.

3. The processor-implemented method of claim 1, wherein generating the output inference is performed while processing input data during a runtime phase of the neural network.

4. The processor-implemented method of claim 1, wherein generating the output inference is performed while processing training data during a training phase of the neural network.

5. The processor-implemented method of claim 1, further comprising generating an activation loss based at least in part on the feature mask, wherein refining the one or more parameters of the masking subnetwork is based further on the activation loss.

6. The processor-implemented method of claim 5, wherein the activation loss is generated based at least in part on an expectation of the feature mask and an activation rate, wherein the activation rate is a hyperparameter that controls what percentage of the feature tensor is masked.

7. The processor-implemented method of claim 5, further comprising generating a task loss based at least in part on the masked feature tensor, wherein refining the one or more parameters of the masking subnetwork is based further on the task loss.

8. The processor-implemented method of claim 7, further comprising, prior to refining the one or more parameters of the masking subnetwork, aggregating the polarization loss, activation loss, and task loss using a set of defined weights, wherein the set of defined weights control polarization of the feature mask.

9. The processor-implemented method of claim 7, further comprising refining one or more prior layers of the neural network based at least in part on the polarization loss, activation loss, and task loss.

10. A system comprising:
    memory comprising computer-executable instructions; and
    one or more processors configured to execute the computer-executable instructions and cause the system to perform an operation comprising:
        accessing a feature tensor in a neural network;

generating a feature mask by processing the feature tensor using a masking subnetwork, wherein the masking subnetwork was trained based at least in part on a polarization constraint and an activation constraint to generate feature masks;

generating a polarization loss based at least in part on the feature mask, wherein the polarization loss is generated based at least in part on an expectation of a product of the feature mask and an inverse of the feature mask;

refining one or more parameters of the masking sub-network based on the polarization loss;

generating a masked feature tensor based on the feature tensor and the feature mask; and generating an output inference using the neural network based at least in part on the masked feature tensor.

11. The system of claim 10, wherein generating the output inference is performed while processing input data during a runtime phase of the neural network.

12. The system of claim 10, the operation further comprising generating an activation loss based at least in part on the feature mask, wherein refining the one or more parameters of the masking subnetwork is based further on the activation loss.

13. The system of claim 12, wherein the activation loss is generated based at least in part on an expectation of the feature mask and an activation rate, wherein the activation rate is a hyperparameter that controls what percentage of the feature tensor is masked.

14. The system of claim 12, the operation further comprising generating a task loss based at least in part on the masked feature tensor, wherein refining the one or more parameters of the masking subnetwork is based further on the task loss.

15. The system of claim 14, the operation further comprising, prior to refining the one or more parameters of the masking subnetwork, aggregating the polarization loss, activation loss, and task loss using a set of defined weights, wherein the set of defined weights control polarization of the feature mask.

16. The system of claim 14, the operation further comprising refining one or more prior layers of the neural network based at least in part on the polarization loss, activation loss, and task loss.

17. One or more non-transitory computer-readable media comprising instructions that, when executed by one or more processors of a processing system, cause the processing system to perform an operation comprising:

accessing a feature tensor in a neural network;

generating a feature mask by processing the feature tensor using a masking subnetwork, wherein the masking subnetwork was trained based at least in part on a polarization constraint and an activation constraint to generate feature masks;

generating a polarization loss based at least in part on the feature mask, wherein the polarization loss is generated based at least in part on an expectation of a product of the feature mask and an inverse of the feature mask;

refining one or more parameters of the masking subnetwork based on the polarization loss;

generating a masked feature tensor based on the feature tensor and the feature mask; and generating an output inference using the neural network based at least in part on the masked feature tensor.

18. The one or more non-transitory computer-readable media of claim 17, wherein generating the output inference is performed while processing input data during a runtime phase of the neural network.

19. The one or more non-transitory computer-readable media of claim 17, the operation further comprising generating an activation loss based at least in part on the feature mask, wherein refining the one or more parameters of the masking subnetwork is based further on the activation loss.

20. The one or more non-transitory computer-readable media of claim 19, wherein the activation loss is generated based at least in part on an expectation of the feature mask and an activation rate, wherein the activation rate is a hyperparameter that controls what percentage of the feature tensor is masked.

21. The one or more non-transitory computer-readable media of claim 19, the operation further comprising generating a task loss based at least in part on the masked feature tensor, wherein refining the one or more parameters of the masking subnetwork is based further on the task loss.

22. The one or more non-transitory computer-readable media of claim 21, the operation further comprising, prior to refining the one or more parameters of the masking subnetwork, aggregating the polarization loss, activation loss, and task loss using a set of defined weights, wherein the set of defined weights control polarization of the feature mask.

23. The one or more non-transitory computer-readable media of claim 21, the operation further comprising refining one or more prior layers of the neural network based at least in part on the polarization loss, activation loss, and task loss.

24. A system comprising:

means for accessing a feature tensor in a neural network;

means for generating a feature mask by processing the feature tensor using a masking subnetwork, wherein the masking subnetwork was trained based at least in part on a polarization constraint and an activation constraint to generate feature masks;

means for generating a polarization loss based at least in part on the feature mask, wherein the polarization loss is generated based at least in part on an expectation of a product of the feature mask and an inverse of the feature mask;

means for refining one or more parameters of the masking subnetwork based on the polarization loss;

means for generating a masked feature tensor based on the feature tensor and the feature mask; and means for generating an output inference using the neural network based at least in part on the masked feature tensor.

* * * * *